US010838182B2

(12) United States Patent
Veis et al.

(10) Patent No.: US 10,838,182 B2

(45) Date of Patent: Nov. 17, 2020

(54) RADIATION SOURCES FOR COLORANTS

(71) Applicant: HP SCITEX LTD., Netanya (IL)

(72) Inventors: Alex Veis, Netanya (IL); Ronald Albert Askeland, San Diego, CA (US)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 16/809,812

(22) Filed: Mar. 5, 2020

(65) Prior Publication Data

US 2020/0301120 A1 Sep. 24, 2020

(30) Foreign Application Priority Data

Mar. 22, 2019 (EP) .................................... 19164759

(51) Int. Cl.

*G02B 19/00* (2006.01)
*F21V 9/08* (2018.01)
*G02B 27/14* (2006.01)

(52) U.S. Cl.

CPC ............ *G02B 19/0066* (2013.01); *F21V 9/08* (2013.01); *G02B 27/145* (2013.01)

(58) Field of Classification Search

CPC ............ G02B 19/0066; G02B 19/0028; G02B 27/145; F21Y 2115/10; F21V 5/007; F21V 9/08; C09D 11/101; C09D 11/322; C09D 11/50

USPC .......................................................... 362/555

See application file for complete search history.

(56) References Cited

U.S. PATENT DOCUMENTS

| | | | |
|---|---|---|---|
| 7,252,360 B2 | 8/2007 | Hersch et al. | |
| 7,414,751 B2 | 8/2008 | Yamazaki et al. | |
| 7,519,280 B2 | 4/2009 | Yip et al. | |
| 8,070,283 B2 | 12/2011 | Kusunoki | |
| 9,969,894 B2 | 5/2018 | Hirade et al. | |
| 2006/0170745 A1* | 8/2006 | Deroover | C09D 11/40 347/100 |
| 2011/0050822 A1 | 3/2011 | Fujisawa et al. | |
| 2012/0194622 A1 | 8/2012 | Iraqi et al. | |
| 2013/0077055 A1* | 3/2013 | Wang | F21V 13/08 353/31 |
| 2015/0029277 A1 | 1/2015 | Boland et al. | |
| 2015/0116415 A1* | 4/2015 | Chretien | C09D 11/107 347/20 |

(Continued)

FOREIGN PATENT DOCUMENTS

| | | |
|---|---|---|
| EP | 3124261 | 2/2017 |
| JP | 2014196497 | 10/2014 |

(Continued)

*Primary Examiner* — Cara E Rakowski
*Assistant Examiner* — Jessica M Apenteng
(74) *Attorney, Agent, or Firm* — HP Inc. Patent Department

(57) ABSTRACT

In an example, apparatus includes a first radiation source to output radiation at a first waveband and a second radiation source to output radiation at a second waveband, which is different from the first waveband. The apparatus may receive a medium having marked thereon a first colorant and a second colorant and the first and second wavebands may be selected such that an energy absorbance efficiency of the first colorant is higher than that of the second colorant at the first waveband and an energy absorbance efficiency of the second colorant is higher than that of the first colorant at the second waveband.

15 Claims, 7 Drawing Sheets

400
440
430
410
420
412
422
450

(56) References Cited

U.S. PATENT DOCUMENTS

| | | | | |
|---|---|---|---|---|
| 2016/0005939 | A1* | 1/2016 | Andrews | H01L 33/62 257/91 |
| 2017/0305066 | A1 | 10/2017 | Nauka et al. | |
| 2018/0251646 | A1* | 9/2018 | Rolland | C08F 2/48 |

FOREIGN PATENT DOCUMENTS

| | | |
|---|---|---|
| WO | WO-1997038863 | 10/1997 |
| WO | WO-2016048375 | 3/2016 |

* cited by examiner

Figure 6:
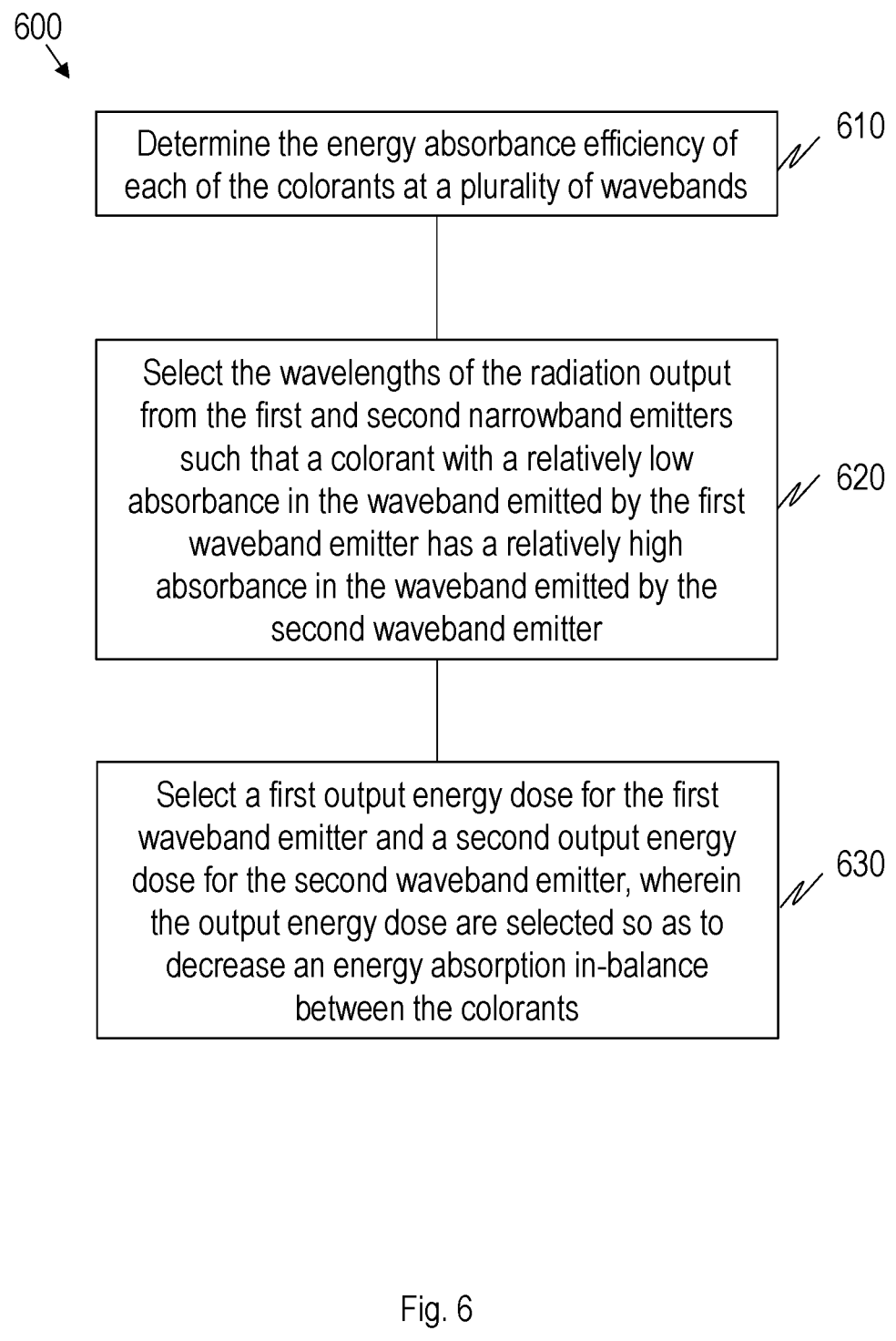

600

Determine the energy absorbance efficiency of each of the colorants at a plurality of wavebands

610

Select the wavelengths of the radiation output from the first and second narrowband emitters such that a colorant with a relatively low absorbance in the waveband emitted by the first waveband emitter has a relatively high absorbance in the waveband emitted by the second waveband emitter

620

Select a first output energy dose for the first waveband emitter and a second output energy dose for the second waveband emitter, wherein the output energy dose are selected so as to decrease an energy absorption in-balance between the colorants

RADIATION SOURCES FOR COLORANTS

BACKGROUND

In print operations, printing substances such as inks, fixers, primers and coatings may be applied to a medium. A medium bearing such a substance may be heated in order to dry and/or fix some substances to the medium. In examples, the heat may be supplied using hot air convection, infrared heaters, near infrared dryers, acoustic dryers, gas burners, Radio Frequency dryers, microwave dryers or the like.

BRIEF DESCRIPTION OF DRAWINGS

Non-limiting examples will now be described, with reference to the accompanying drawings, in which:

FIG. 6 is an example flowchart of a method of calibrating or controlling an apparatus to heat printed colorant.

DETAILED DESCRIPTION

Heating substances printed on a medium may form part of a printing process. Example mediums may comprise paper, card, metal, glass, vinyl, polyester, nylon and other plastics. Once printing substances such as ink have been applied to the medium, the medium may be heated to form the final print product. For example, the medium may be heated to evaporate solvent from the medium. In some examples, the medium may be heated to cause ink to fix and adhere to the medium. In some examples, heating may be used to cause sublimation of dye sublimation inks.

Printing processes may include 2D or 3D printing processes. 3D printing processes may also be referred to as additive manufacturing processes, and may print colorants on to a medium which is intended to be fused. Such a medium may be referred to as a build material, and may for example comprise plastic or metal particles. Such a medium may be caused to fuse to form a solid object using radiation such as heat. In this context, 'colorant' may include any print agent which is capable of absorbing radiation, and may include print agents which contribute to increasing the temperature of the build material by absorbing energy, for example such that build material to which a colorant has been applied may reach a melting temperature when radiation is applied, whereas build material which is left free of such a colorant (or to which a different agent has been applied) may remain below its melting temperature. In this way, colorants may be used to effect selective fusing in a layer of build material.

In some examples, LEDs have been proposed for heating printed substances on media. For example, systems have been proposed in which ultraviolet light emitting diodes (UVLEDs) are used to irradiate a medium having ink printed thereon to dry the ink printed on the medium. The colorants used in some print operations have been shown to absorb UV light efficiently. Therefore, irradiating ink comprising such colorants with a narrowband UV source, such as a UVLED, may cause the colorants to reach high temperatures in seconds, or even in milliseconds, of exposure time (compared to other systems which may take tens of seconds, or minutes). LED-based heating of print media may therefore be used to efficiently heat printed substances such as ink. Other LEDs, including those in the visible and the infrared ranges, may be used in other examples for heating printed substances on media.

Figure 1:
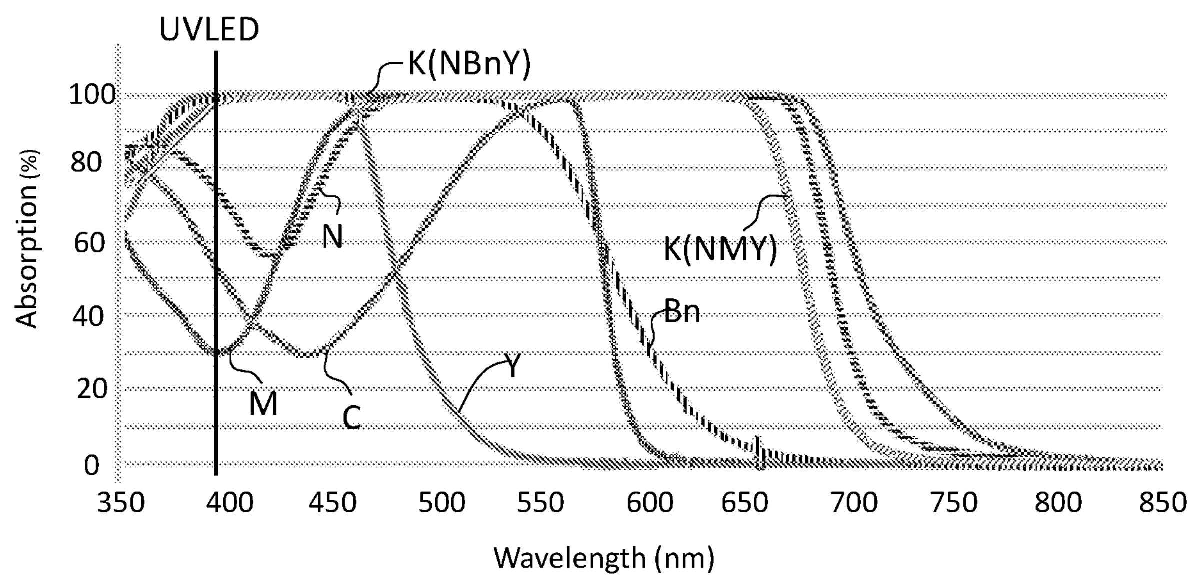
FIG. 1 shows examples of absorption efficiency for different colorants irradiated by different wavelengths of light.

In some examples, a set of colorants may be used in a printing operation, and each colorant of the set may be associated with an absorption efficiency to a particular wavelength of light. FIG. 1 illustrates an example absorption efficiency spectrum for a particular set of colorants. FIG. 1 illustrates the absorption efficiency of example Yellow Y, Magenta M, Navy N, Cyan C, Brown Bn and Black K colorants. Two types of black K colorant are illustrated, one formed from navy, brown and yellow K(NBnY) and one formed from navy, magenta and yellow K(NMY). As illustrated in FIG. 1, across the spectrum, the absorption efficiency of the colorants at particular wavelengths can vary greatly.

In the illustrated example, an output radiation wavelength of 395 nm is also labelled, which is a wavelength that may be output by a UVLED. At this wavelength, the absorption efficiency of black K(NMY), black K(NBnY), Brown Bn and yellow Y is near 100%. However, the absorption efficiency of navy N is around 75% at 395 nm, whilst the absorption efficiency of cyan C is around 55% and the absorption efficiency of Magenta M is around 30% at this wavelength. Therefore, in such examples, black, brown and yellow may absorb 395 nm wavelength light efficiently and may dry having received a relatively low energy dose. However, in CMYK print operations, in order to provide an energy dose with 395 nm light which is sufficient to dry magenta, using the same energy dose for black and yellow colorants may cause these colorants to overheat due to their greater absorption efficiency to 395 nm light. This can result in degradation of the colorant and/or, in some examples, this may cause an underlying substrate or media to scorch or, in some cases such as when the colorants are printed on a medium such as a plastic or vinyl, melt as such mediums may have a relatively low melting point.

Figure 2:
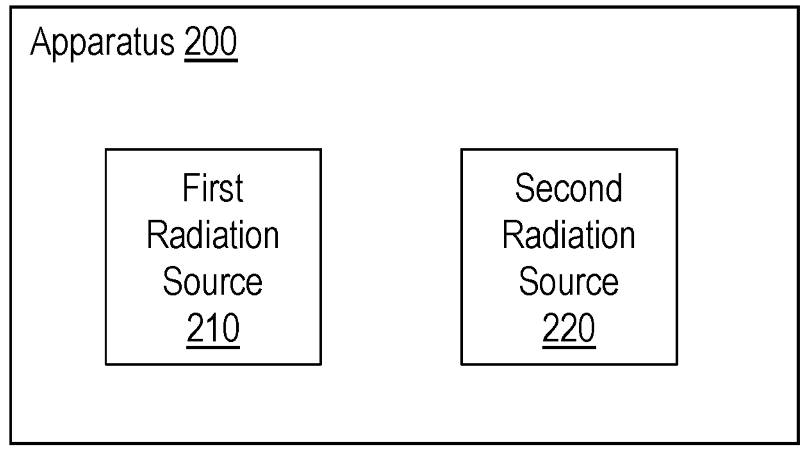
FIG. 2 is a simplified schematic of an example of an apparatus to heat printed colorant.

FIG. 2 shows an apparatus 200 comprising a first radiation source 210 to output radiation at a first waveband. The apparatus 200 further comprises a second radiation source 220 to output a second waveband, different from the first waveband. In some examples, the first and second wavebands (or the central wavelengths thereof) may be separated, for example by tens or even hundreds of nanometres. The apparatus 200 is to receive a medium having marked thereon a first colorant and a second colorant. For example, the apparatus 200 may receive a printed medium, such as printed paper, card, fabric, vinyl, polyester, nylon, plastic or the like. In some examples, the apparatus 200 may comprise part of a print apparatus. The first and second wavebands in this example are selected such that an energy absorbance efficiency of the first colorant is higher than that of the second colorant at the first waveband and an energy absorbance efficiency of the second colorant is higher than that of the first colorant at the second waveband.

In other words, the apparatus 200 emits light at at least two distinct (e.g. non-contiguous, or non-continuous) wavebands. In some examples, the first and second radiation sources may comprise narrowband emitters, where the output of each radiation source 210, 220 is effectively a single waveband, for example emitting energy with waveband bandwidth of no more than about 15 or 20 nm (which may for example be a Full Width at Half Maximum (FWHM) bandwidth, or may be some other measurement of bandwidth). The apparatus 200 does is configured so as to emit substantially no light between the wavebands. The radiation source may be characterised by the peak wavelength of emission. The first and second wavebands are selected so as to balance the energy absorption of the first and second colorants: whereas one colorant has a higher absorption at one of the wavebands, the other colorant has a higher absorption at the other waveband.

In this way, by selection of wavebands which are complimentary to the colorants in use, an imbalance in absorption efficiency of the colorants overall may be at least reduced. As will be further set out below, by controlling the energy dose delivered by each radiation source, a further reduction in imbalance may be achieved in some examples. The energy dose may for example be controlled by controlling the intensity of an output and/or an exposure time.

In some examples, the wavebands may be selected such that the energy absorbed by the colorants (which may be the first and second colorants, and/or all colorants of a colorant set applied to the media) is within a factor of two (i.e. when considering energy absorbed per square centimetre of printed colorant, the energy absorbed by the least absorbent colorant over the at least two wavebands may be at least half that absorbed by the most absorbent colorant over the two wavebands). In some examples, the wavebands may be selected such that the energy absorbed by each of the colorants, or by the colorants with respectively the highest total absorbance over the two wavebands and the lowest total absorbance over the two wavebands, is within a factor of 1.5 of each other, or within a factor of 1.2 of each other. The first colorant may be the colorant of the colorant set with the highest absorbance at the first waveband and the second colorant may be the colorant of the colorant set with the highest absorbance at the second waveband.

The first and second radiation sources 210, 220 may, in some examples, comprise light emitting diodes (LEDs), which in some examples may be any or any combination of ultraviolet LEDs, visible light LEDs and Infrared LEDs. The first and second radiation sources 210, 220 may emit optical radiation, which, as the term is used herein, is taken to include all radiation from the far ultraviolet, through the visible spectrum, to the far infrared. In some examples, the first and second radiation sources 210, 220 may be provided within an array of radiation sources. For example, there may be an array of LEDs, at least a subset of which may emit radiation at the first waveband and another subset of which may emit radiation at the second waveband. In some examples, at least one of the radiation sources 210, 220 may be a tuneable radiation source, whereas in other examples the radiation sources 210, 220 may have a single, predetermined, waveband of operation. While in some examples, the first and second wavebands may be provided from a single radiation source which is retuned, there may be more than one radiation source to facilitate providing radiation at both wavebands within an overlapping timeframe, which may be substantially coincident, in order to shorten the treatment time.

While FIG. 2 describes an apparatus with two radiation sources, there may be more than two radiation sources. However, in some examples, the number of different wavebands emitted by any number of radiation sources may be relatively low. For example, the apparatus may emit radiation in just two distinct narrow wavebands, or just three narrow wavebands. In one example, the number of different wavebands may be equal to, or smaller than, the number of colorants which are to be heated thereby. In addition, whilst FIG. 2 describes apparatus 200 in which the radiation absorption is balanced over two colorants, in other examples, there may be more than two colorants and the apparatus 200 may be configured with radiation sources which emit wavebands as appropriate to at least partially balance energy absorption across the set of colorants.

Figure 3:
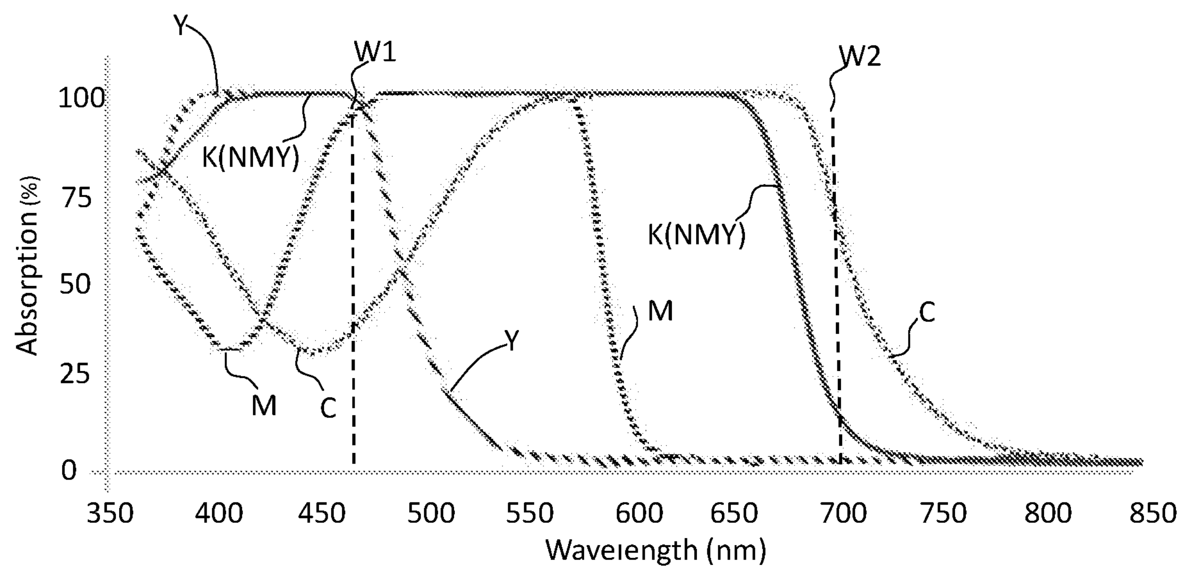
FIG. 3 shows further examples of absorption efficiency for different colorants irradiated by light at different wavelengths.

FIG. 3 shows the absorption efficiency spectrum for some of the colorants of FIG. 1. Labelled in FIG. 3 are the abortion efficiency of Yellow Y, Magenta M, Cyan C, and a Black K colorant formed from navy, magenta and yellow K(NMY). Also labelled in FIG. 3 are two wavelengths, the first wavelength W1 and second wavelength W2. In the illustrated example, the first wavelength W1 corresponds to a wavelength of 465 nm and the second wavelength W2 corresponds to a wavelength of 700 nm. In one example, the first wavelength W1 may be the central wavelength of a narrow waveband output by the first radiation source 210 of the apparatus 200 and the second wavelength W2 may be the central wavelength of a narrow waveband output by the second radiation source 220 of the apparatus 200.

As illustrated in FIGS. 1 and 3, the absorption efficiency of the different colorants can differ greatly across the spectrum. However, using an apparatus such as apparatus 200, more uniform heating of colorants can be achieved with non-uniform absorption efficiencies for the colorants at a single wavelength/waveband.

In the example of FIG. 3, a colorant set comprising particular formulations of cyan C, magenta M, yellow Y, and black K(NMY) is considered. The magenta M, yellow Y, and black K(NMY) colorants all comprise a relatively high absorption efficiency of greater than 90% to the first wavelength W1. However, Cyan C has a relatively low absorption efficiency to the first wavelength W1, with an absorption efficiency of about 40% at the first wavelength W1. At the second wavelength W2, cyan C has a relatively high absorption efficiency of about 70%, whereas black K(NMY) may have an absorption efficiency of about 10% and magenta M and yellow Y all have an absorption efficiency of less than 1%. It may therefore be noted that Cyan C colorant has a lower absorption efficiency than any example other colorant at wavelength W1 but a higher absorption efficiency than any example other colorant at wavelength W2.

Using exclusively the first wavelength W1 or exclusively the second wavelength W2 to heat the colorants may result in issues associated with non-uniform absorption as described above. However, in some examples, the first wavelength W1 and the second wavelength W2 may be used in tandem to irradiate a medium having printed thereon colorants to achieve increased uniformity in heating of the colorants.

In one example, irradiating a medium having printed thereon cyan, magenta, yellow and black (CMYK) colorant with both the first wavelength W1 and the second wavelength W2 may achieve substantially uniform heating of all colorants applied to the medium. In the illustrated example of FIG. 3, magenta M, yellow Y and black K(NMY) colorants comprise a high absorption efficiency to the first wavelength W1 and may absorb radiation at this wavelength efficiently and increase in temperature due to the absorption of the radiation in a short exposure time. Cyan C colorant has a lower absorption efficiency at the first wavelength W1 and thus may not increase to similar temperatures as magenta M, yellow Y and black K colorants from the radiation at the first wavelength W1. However, as cyan C has a relatively high absorption efficiency to the second wavelength W2, irradiation of the colorants by the second wavelength may cause cyan to rapidly increase in temperature. The magenta, yellow and black colorants may not increase with such a rapid rate of temperature increase under irradiation by radiation at wavelength W2, as these colorants have a lower absorption efficiency to the second wavelength W2 than Cyan.

The first wavelength W1 and second wavelength W2, individually, may not be able to perform sufficiently uniform heating of such CMYK colorants printed on a medium when considering, for example, potential detrimental effects to either the colorant or the medium on which the colorant is printed. However, using the first wavelength W1 and second wavelength W2 in tandem (e.g. during a common or overlapping timeframe) may achieve an increase in uniformity of heating of a plurality of colorants printed on a medium. Irradiating the printed medium with the first wavelength W1 and the second wavelength W2 may mean that each colorant comprises a relatively high absorption efficiency to at least one of the provided radiation wavebands. Each colorant may also comprise a relatively low absorption efficiency to the other provided waveband. Therefore, irradiation of a printed medium may mean that each colorant may absorb one waveband efficiently and increase in temperature as a result of the absorption. However, as in this example each colorant comprises a low absorption efficiency to the other waveband, irradiation by this waveband may not substantially affect the increase in temperature, as the respective colorant may absorb that waveband inefficiently. As such, irradiation of the medium by both sources may allow increased uniformity in heating of all colorants on the medium, without any colorant being raised to temperatures that may cause detrimental effects to occur to the colorant or to a medium, such as the medium melting. This may be a particular concern with certain medium materials, for example vinyl, polyester, nylon and plastic, which may have a relatively low melting temperature.

While in this example there is a large difference in absorption efficiency for all colors between the selected wavelengths W1 and W2, this need not be the case in all examples. In some examples, the absorption efficiencies may be relatively similar. However, selection of a plurality of wavelengths/wavebands may nevertheless increase uniformity of heating across all colorants compared to the selection of a single wavelength/waveband. As is noted in greater detail below, in some examples, by considering the energy dose output by each radiation source, a further increase in uniformity of heating across a set of colorants can be achieved.

Figure 4:
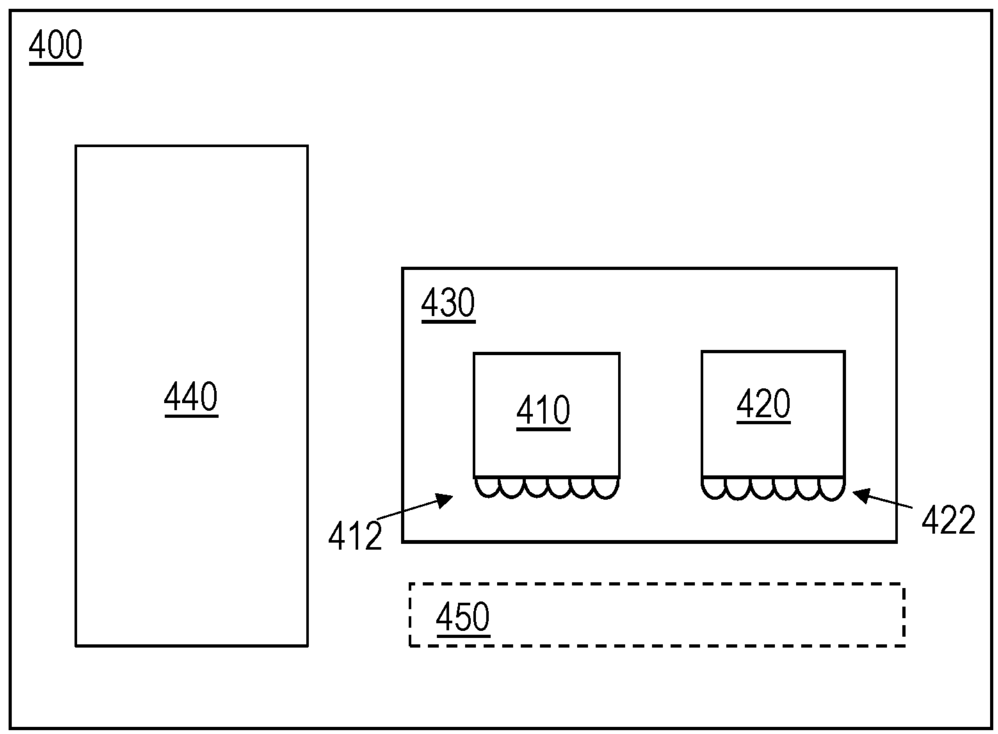
FIG. 4 is a simplified schematic of an example of an apparatus to heat printed colorant.

FIG. 4 illustrates another example of an apparatus 400 to heat a medium having colorant printed thereon by a printer 440. The apparatus 400 comprises a first radiation source 410 to output radiation at a first waveband and a second radiation source 420 to output radiation at a second waveband, different from the first waveband. In some examples the first and second radiation sources 410, 420 may output radiation simultaneously, or over the same timeframe. In some examples, the first and second wavebands are non-overlapping and not continuous, for example being separated by at least 50 nm, 100 nm, or 200 nm. The apparatus 400 is configured not to emit light at any intervening wavelengths. The first and second radiation sauces 410, 420 are provided as part of a radiation source array 430. The first radiation source 410 comprises a first sub-array of LEDs 412 and the second radiation source comprises a second sub-array of LEDs 412.

The first and second radiation sources 410, 420 in this example have been chosen to output radiation such that a difference (in some examples, the maximum difference) in energy absorption between colorants of a colorant set which are printed on a medium is within a predetermined range. In some examples, it may be impractical to implement a system where the printed colorants absorb radiation from the first and second radiation sources 410, 420 with exact uniformity. This may be due to the availability of colorants, the availability and capabilities of practical radiation sources, and/or due to variables that affect the exact absorption efficiency characteristics of a colorant. Such variables affecting the absorption characteristics of a colorant may comprise: colorant formulation, print media type, print media material, print media dimensions, the method by which the colorant was printed, a carrier matrix in which the colorant may be delivered (e.g. a carrier fluid) and dimensions of the colorant on the print media. In other examples, it may not be possible or practical to source radiation sources having a waveband which provides for an exact balance.

Therefore, in some examples, the absorption efficiency of two or more colorants (or a set of colorants used by a print apparatus) may be considered uniform if the absorption efficiency to the radiation output by the first and second radiation sources 410, 420 differs by no more than a threshold difference, for example by no more than about 50%. In other examples, the absorption efficiencies may be considered uniform if the efficiencies of the colorants differ by no more than about 40%, 30%, 25%, 20%, 15% or 10%. In one example, the first and second wavebands are selected such that a first absorption efficiency of the first colorant to the first waveband and a second absorption efficiency of the second colorant to the second waveband differ by no more than 50%. Such absorption efficiency may be compared, for example, on the basis of energy absorption per unit area (for example per square centimetre).

The energy absorption may be determined based on comparative samples of applied colorant. For example, a print apparatus may print a colorant with anything between 0 to 100% coverage, where 100% coverage corresponds to the maximum amount of print agent which can be applied to a particular medium by particular apparatus. In some examples the absorption efficiency may be determined for a set of colorants printed using the same coverage level (for example 100% coverage) on a common medium, and the energy absorbed per unit area of each colorant on that medium may be determined.

For example the energy absorbed per unit area may be determined by determining the amount of energy that is converted into heat. In some examples, the temperature of the medium may be measured during an exposure of radiation to determine how much energy passed through the colorant to the medium, and how much was absorbed by the colorant. In some examples, a first photodetector may be placed on the opposite side of the media to the radiation source and a second photodetector may be positioned proximate to the radiation source. In this way, the first photodetector may determine how much radiation passes through the medium and the second photodetector may determine how much radiation is reflected from the medium, during an exposure. From these two readings the energy absorbance of the colorant on the medium may then be determined.

In some examples, the energy absorbance for the colorants may be determined by directly measuring the optical density of the colorants after irradiation, for example, for colorants used in dye sublimation operations, as this allows the degree of sublimation which has occurred to be determined.

In some such examples, the medium may also be observed and inspected the medium for damage.

In the example of FIG. 4, the LEDs of the first and second sub-arrays 412, 422 are narrowband sources. In some examples, a narrowband source may correspond to a source outputting radiation with a waveband bandwidth (e.g. a FWHM spectral bandwidth) of no more than about 20 nm. In other examples, a narrowband source may correspond to a source outputting radiation with a waveband bandwidth of no more than about 15 nm. LEDs may be capable of outputting narrowband radiation, which may be used to heat colorant through the absorption of the radiation output by the LEDs and absorbed by the colorant.

While in this example the apparatus 400 comprises an LED array 430 comprising two sub-arrays, in other examples, different radiation sources may be intermingled in any array, or a radiation source 410, 420 may be controllable to set the waveband thereof. In some examples, the apparatus 400 may further comprise a controller to control the first radiation source 410 and the second radiation source 420. In some examples, such a controller may control the LED array 430. In some examples, the LED array 430 may be controlled to power on and off rapidly to irradiate a medium 450 (shown in dotted outline as this does not comprise part of the apparatus 400) having colorant printed thereon. For example, the LED array 430 may be controlled with a duty cycle, and the duty cycle used may in turn control the energy dose provided thereby (for example using 'pulse width modulation'. In some examples, a length of exposure of the colorants to the radiation may be controlled (which may be a total length over a plurality of cycles or pulses). In some example, the energy doses may be delivered at least partially concurrently or over the same time period.

In some examples, the intensity of power output from each LED, or each LED sub-array 412, 422, or each radiation source 410, 420, may be set or controlled by controlling the amount of current delivered thereto, or the like. The energy dose may for example be controlled, at least in part, by controlling the intensity of power output.

In some examples, the number of LEDs provided or used to irradiate a particular set of colorants may be controlled to control, at least in part, an energy dose.

Thus, an energy dose of a particular radiation waveband may be controlled by controlling any or any combination of the number of LEDs, the intensity of output of each LED, the duty cycle of each LED, the exposure time of irradiation, or the like.

In this example, the LED array 430 is sized such that the array 430 may irradiate substantially an entire medium 450 bearing colorant by powering on the LED array (for example, an entire media sheet). In other examples, media may be moved past the LED array 430, or the LED array 430 may be moved over media.

In this example, the apparatus 400 comprises a printer 440. The printer 440 may comprise any kind of print apparatus. In some examples, the printer 440 may comprise an inkjet printer, an electrophotographic printer (which may be a liquid electrophotographic printer), an offset printer, a flexography printer, gravure printer, screen printer, or the like. In one example, the printer 440 may print colorants, which may comprise dyes or pigments, ink (including liquid electrophotographic inks), toners, and the like. In one example, the printer 440 may print colorants on to plastic, vinyl, polyester, nylon, and the like.

In one example, the printer 440 may comprise a 3D printer, or additive manufacturing apparatus, which may print colorants onto a medium comprising a layer of build material. In some examples, the build material may be a powder-like granular material, which may for example be a plastic, ceramic or metal powder. The colorants may comprise at least one fusing agent (also termed a 'coalescence agent' or 'coalescing agent') which may be selectively distributed onto portions of a layer of build material in a pattern derived from data representing a slice of a three-dimensional object to be generated (which may for example be generated from structural design data). The colorant(s) may have a composition which absorbs energy such that, when energy (for example, heat) is applied to the layer, the build material heats up, coalesces and solidifies upon cooling, to form a slice of the three-dimensional object in accordance with the pattern. In examples, such a fusing agent may comprise any or any combination of an infra-red light absorber, a near infra-red light absorber, a visible light absorber and a UV light absorber. Examples of print agents comprising visible light absorbers are dye based colored ink and pigment based colored ink. The colorant(s) may provide a particular color for an object.

In operation, the printer 440 prints on the medium 450, and may print with any of a predetermined set of colorants. The first and second wavebands of radiation output from the first radiation source 410 and second radiation source 420, respectively, is selected such that an energy absorbance efficiency of a first colorant of the set of colorants is higher than that of a second colorant at the first waveband and an energy absorbance efficiency of the second colorant is higher than that of the first colorant at the second waveband. More generally, and as discussed above, wavebands of radiation output from the first radiation source 410 and the second radiation source 420 may result in increased uniformity in absorption of radiation by the set of colorants to achieve heating of the colorants when compared to selecting a single radiation source.

In some examples, the predetermined set of colorants may comprise a Black colorant which has a significantly different absorption efficiency at the different wavebands. For example, the absorption efficiency of the black colorant at the different wavebands may vary by at least 50%, or at least 60%, or at least 70% or at least 80%. This may be contrasted with, for example, carbon black, which may have substantially similar absorption efficiency over the whole visible light spectrum.

In particular examples, the colorant set may be selected based on an intended medium to be printed. For example, while a print apparatus may be capable of printing using a carbon black colorant, when the medium is a temperature sensitive medium such as vinyl or nylon (i.e. is relatively likely to be damaged at relatively low temperatures compared to more robust substrates such as paper or card). Methods of operating a print apparatus may include selection of a colorant set which excludes carbon black may be made such that the heating methods used herein utilising two distinct wavebands may be employed effectively without overheating which may otherwise be caused by high absorbance of carbon black ink at both (or all) wavebands.

For example, a print apparatus may be capable of printing using a CYMK color set, where the black is a carbon black colorant. However, when a temperature sensitive medium is to be printed, a method may include limiting the colorant set for printing to the CYM colorants only (using the fact that a black can be produced by a combination of these colors), albeit that a carbon black based black may be cheaper and/or darker. In another example, a print apparatus may have a choice of pre-formulated black inks, including at least one carbon black and at least one other ink, the other ink having a significantly different absorption efficiency at the different wavebands. Methods may comprise selecting the carbon black ink for use with non-temperature sensitive media, which may, in some examples, be heated using just one waveband source, or a wideband source, and selecting the other black ink (which is not a carbon black ink) for use with temperature sensitive media, which may be heated using at least two or more distinct wavebands of radiation, as is described herein.

In some examples, the radiation output by the first radiation source 410 and second radiation source 420 may be selected based on a predetermined set of colorants to be used by the printer 440. In some examples, the printer 440 may be operable with different color sets. In such examples, different radiation sources may be provided, or the first and second radiation sources 410, 420 may be controlled to emit a different radiation waveband based on the set of colorants in use. In other words, the apparatus 400 may comprise a plurality of sources to output radiation at a plurality of wavebands and the first radiation source and the second radiation source may be selected or configured based on a predetermined set of colorants. This may allow the printer 440 to adapt to different sets of colorants, which may be associated with different absorption spectrums.

While the content of a printed image may be taken into account when selecting the wavebands, this need not be the case in all examples as energy absorption across an entire set of colorants may be sufficiently balanced such that, whatever image is printed, an imbalance between energy absorption of the different colorants may be kept within a suitable range.

In operation, once the printer 440 has printed colorant onto a medium, such as medium 450, the first radiation source 410 and the second radiation source 420 may be controlled to power on and irradiate the first and second colorant on the medium 450. In some examples, the apparatus 400 may comprise a controller to control the first and second source. In some examples, the apparatus 400 may comprise a controller to select the colorant set used in printing, for example based on a media to be printed, for example so as to avoid the use of carbon black.

In one example, the first radiation source 410 may output radiation at the first waveband to provide a first energy dose. In some examples, the second radiation source 420 may output radiation at the second waveband to provide a second energy dose. In some examples, the first energy dose and the second energy dose may be selected such that a rate of heating of the first colorant and the second colorant from absorption of radiation at the first waveband and the second waveband may be substantially uniform, or at least more uniform than if the energy dose at which radiation was output was the same. In one example, a first rate of heating of the first colorant may be considered uniform with a second rate of heating of the second colorant, if the rate of heating differs by no more than about 50%. In some examples, the first rate of heating and the second rate of heating may be considered uniform if they differ by no more than about: 40%, 30%, 25%, 20% or 10%. In one example, a rate of heating of a colorant may be determined by taking a temperature reading of the colorant over an interval of time.

In some examples, the first energy dose and the second energy dose may be selected or controlled such that each of the first colorant and the second colorant (or each colorant of a colorant set) may receive a total energy dose in the range of about 0.5 J/cm$^2$ to 30 J/cm$^2$. In some examples, the first colorant and the second colorant may be irradiated by radiation from the first radiation source 410 and the second radiation source 420 for an exposure time of between about 100 ms to 500 ms. In some examples, the number of such exposures may range from about 1 to about 6. In some examples, the power density of the radiation output from the first radiation source 410 and the second radiation source 420 may be up to about 30 W/cm$^2$. In some examples, the total energy dose may be chosen for a particular print operation (for example, by controlling exposure time, number of exposures, intensity, power density, number of radiation sources or the like). In some examples, the energy dose may be chosen dependent on the type of print media to which colorant is to be applied, and/or the colorants to be applied.

In some examples, the medium 450 may further have marked thereon a plurality of colorants and the first and second wavebands are selected such that an absorbance efficiency of a majority of colorants comprised in the plurality is higher at the first waveband than at the second waveband.

For example, a particular colorant may absorb energy from a radiation source i emitting an energy dose of $E_i$ with an efficiency $Ab_i$. For a number n of radiation sources, this can be characterised as an energy absorption of:

$$\text{Total energy absorbed}=\Sigma_{i=1\ to\ n}(E_i Ab_i)$$

The absorption efficiency is controlled by selection of a waveband and the energy dose is controlled by the power (or energy dose) output from each energy source. The power output may be controlled, for example, by any or any combination of: controlling a constant power level output for such radiation sources, by controlling a pulse width over radiation output from the radiation sources, controlling a total irradiation time, controlling a number of radiation sources providing radiation at a given wavelength, or the like.

The energy dose used depends on factors such as any or any combination of the application, print agent type, media type and on balancing the energy absorption.

In some examples, the light sources may be selected, configured or controlled such that the difference in total energy absorbed over a set of colorants printed on a particular medium with the same coverage is less than a factor of two between the highest and lowest values for the total energy absorbed. In other examples, other factors may be selected as appropriate. For example, the maximum difference may be less than a factor of 1.2, 1.3, 1.5 or the like.

Considering the wavelengths W1 and W2 discussed above with reference to FIG. 3, for a color set made up of Cyan (C), Magenta (M), Yellow (Y) and Black, where the black is Black(NMY), and where W1 is around ~465 nm and W2 is around 700 nm. In this example, the energy dose of both W1 and W2 is controlled to be the same.

In that case, the absorption efficiency of W1 by Magenta, Yellow and Black is around 100% and the absorption efficiency of W1 by Cyan is around 40%. The absorption efficiency of W2 by Black(NMY) is around 10%, the absorption efficiency of W2 by Cyan is around 70%. The absorption efficiency of W2 by Magenta and Yellow is around 0. This gives a relatively balanced absorbed energy ratio of K(NMY):C:M:Y of 110:100:100:110. In this example, the highest and lowest values for the total energy absorbed over set of colorants differ by a factor of 1.1, or by no more than 10%.

It may be noted that, in this color set, the selected Black comprises a colorant having an absorbance which varies over the range of wavelengths used, and in particular has a relatively low absorption at one of the wavelengths. This may not be the case for all Black inks, and in some examples the methods set out herein may be used with colorants (and in particular, Blacks) having an absorbance which is different at the selected wavebands of irradiation. For example, black may be printed using a combination of Cyan, Magenta and Yellow colorants. As noted above, while it is conventional to include a specific Black ink in order to save cost on ink, and to produce deeper black tones, blacks can be produced using a combination of Cyan, Magenta, and Yellow. As also noted above, in some examples, methods may comprise selecting how black may be printed based on the media to be printed, for example based on whether the media is a temperature sensitive media.

Figure 5:
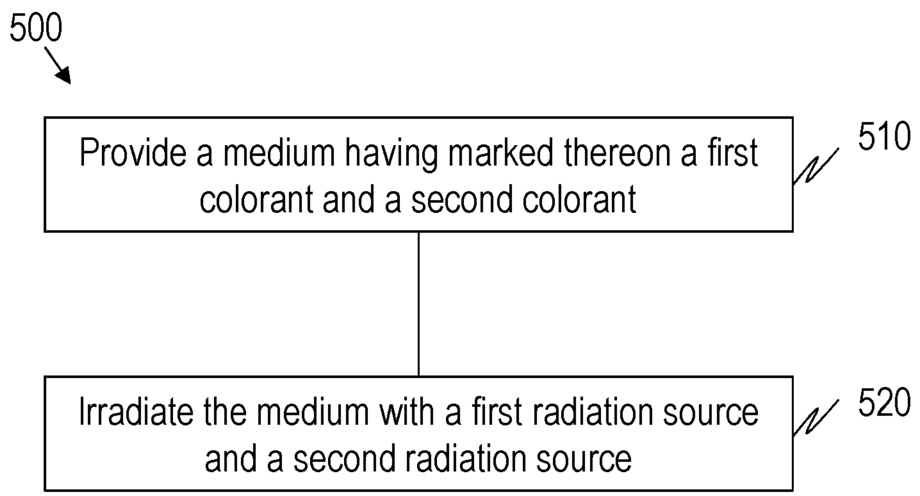
FIG. 5 is an example flowchart of a method of irradiating colorant on a medium.

FIG. 5 is a flowchart of a method 500 of heating colorant having been printed on a medium. The method comprises, in block 510, providing a medium having marked (e.g., printed) thereon a first colorant and a second colorant. The method further comprises, in block 520, irradiating the medium with a first radiation source and a second radiation source. In some examples, irradiating the medium may comprise irradiating the medium with the first radiation source and the second radiation source simultaneously (or at least in an overlapping timeframe). The method 500 further comprises outputting radiation from the first radiation source in a first waveband at a first energy dose, wherein radiation in the first waveband is absorbed with a greater efficiency by the first colorant than by the second colorant. The method 500 also comprises outputting radiation from the second source in a second waveband at a second energy dose, wherein radiation in the second waveband is absorbed with a greater efficiency by the second colorant than by the first colorant.

In some examples, the method 500 may comprise selecting the first energy dose and the second energy dose such that absorbance of the radiation in the first waveband and the radiation in the second waveband by the first and second colorants may be within a predetermined threshold range.

In some examples, the method 500 may comprise selecting the first energy dose and the second energy dose such that absorbance of the radiation in the first waveband and radiation in the second waveband by the first and second colorants causes the first and second colorants to dry on the medium, in some examples in a similar timeframe as each other. In some examples, the method 500 may comprise selecting the first energy dose and the second energy dose such that absorbance of the radiation in the first waveband and radiation in the second waveband by the first and second colorants may cause the first and the second colorants to fix to the medium. In some examples the first and second energy dose may be different, and may be selected so as to increase uniformity of heating of the colorants when compared to emitting radiation from the first and second sources to provide substantially the same energy dose.

In some examples, the method 500 may comprise selecting a colorant set for printing on the medium based on the medium. The medium may for example be identified automatically or by user input. The selection may be based on whether the medium is likely to be damaged by heating to dry at least one available colorant. Therefore, this may comprise consideration of the temperatures to be reached in heating the medium, given an available set of colorants. In some examples, the method may comprise selecting a colorant set for printing on the medium which excludes carbon black colorants when printing on a temperature sensitive medium, such as a medium with a relatively low melting point. The method may further comprise printing the medium using the selected colorant set.

FIG. 6 is a flowchart of a method 600 of calibrating or configuring an apparatus to heat colorant printed on a medium. The method comprises determining, for a predetermined set of colorants, a radiation output from a first narrowband emitter and a second narrowband emitter to heat the colorants. Determining the radiation output from the first and second narrowband source may comprise, in block 610, determining the energy absorbance efficiency of each of the colorants at a plurality of wavebands. In some examples, this may be determined by experimentation.

For example, the energy absorbed per unit area may be determined by determining the amount of energy that is converted into heat. In some examples, the temperature of the media may be measured during an exposure of radiation to determine how much energy passed through the colorant, to the media, and how much may be absorbed by the colorant. In some examples, a first photodetector may be placed on the opposite side of the media to the radiation source and a second photodetector may also be positioned proximate the radiation source. In this way, the first photodetector may determine how much radiation passes through the media and the second photodetector may determine how much radiation is reflected from the media, during an exposure. From these two readings the energy absorbance of the colorant on the media may then be determined. In some examples, the energy absorbance for the colorants may be determined by directly measuring the optical density of the colorants, for example, for colorants used in dye sublimation operations.

In other examples, the energy absorbance efficiency of each of the colorants at a plurality of wavebands may be predetermined and block 610 may comprise determining the efficiency from a look-up table, algorithm or the like.

The method also comprises, in block 620, selecting the wavelengths of the radiation output from the first and second narrowband emitters such that a colorant with a relatively low absorbance in the waveband emitted by the first narrowband emitter has a relatively high absorbance in the waveband emitted by the second narrowband emitter. As described above, this provides for increased uniformity of heating between colorants, increased uniformity in the drying times and the like. The method further comprises, in block 630, selecting a first output energy dose for the first narrowband emitter and a second output energy dose for the second narrowband emitter, wherein the output energy doses are selected so as to maintain an energy absorption imbalance between the colorants to be within a predetermined range. In some examples, the energy absorption imbalance between the colorants may be minimised, given the selection of the first and second narrowband emitters (which may in some examples be constrained to readily available and/or non-cost prohibitive narrowband emitters). Selecting the output energy dose may for example comprise selecting a number of radiation sources, a constant output energy dose of radiation sources, a pulse width of radiation output, or selecting a combination of such power control measures. In some examples, the total output energy dose may be controlled by varying the total number of exposures of the colorant to the radiation output from the first source and the second source. In some examples, rates of heating of the colorants from absorption of the radiation output by the first and second narrowband emitters may differ by no more than a predetermined threshold difference, for example by no more than, at most, 50% between any two colorants of a colorant set.

Figure 7:
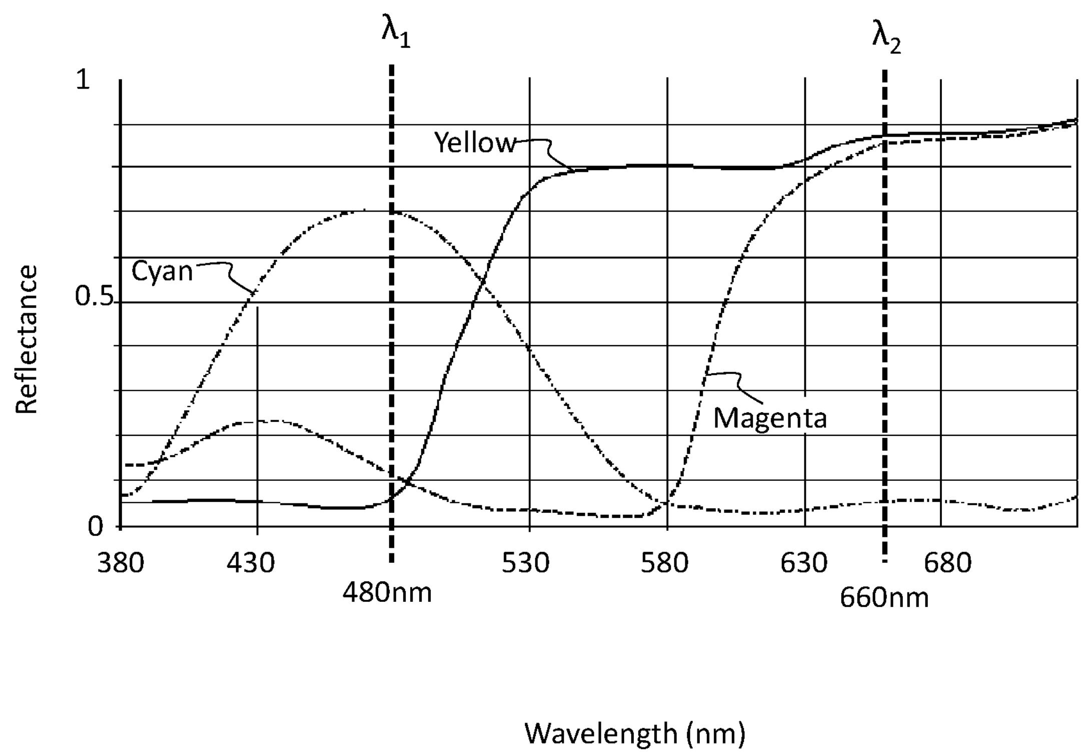
FIG. 7 shows examples of reflectance for a set of colorants irradiated by different wavelengths of light.

FIG. 7 shows an example of a set of colorants which may be used in an example. In this example, the colorants comprise Yellow, Cyan and Magenta, against their measured proportional reflectance. Reflectance is related to absorbance in that light may be reflected, transmitted or absorbed and therefore where reflectance is high, absorbance may generally be low. Where transmittance is negligible, reflectance is the inverse of absorbance. In this example, the selected wavebands for drying the colorants may be 480 nm and 660 nm, as the reflectance (and therefore, in this example, the absorbance) is relatively balanced between these colorants when these selected wavebands are utilised.

In applications in which a printer comprises a set of colorants comprising a carbon black colorant (for example, a CMYK colorant set, where the K is a carbon black), methods set out herein may comprise controlling a print apparatus to print blacks using a combination of CMY colorants (and not the K colorant), before irradiating with two selected wavebands. This selection may for example be made on determination that a medium is a temperature sensitive medium. In other examples, a selection may be made between available Black colorant formulations.

Some examples of colorants which may be used with the methods and apparatus described herein are now discussed in greater detail. In general, the colorants may have any of a range of uses, for example comprising pigmented water-based inks designed for a variety of substrates including paper, Latex inks, pigmented textile inks, LEP electroinks and Dye sublimation inks Colorants may comprise pigments, which may be dissolved or dispersed in a carrier fluid. Such colorants may be used as inks in inkjet printing processes.

As used herein, "pigment" generally includes pigment colorants, magnetic particles, aluminas, silicas, and/or other ceramics or organo-metallics, whether or not such particulates impart colour. Thus, though the present description primarily exemplifies the use of pigment colorants, the term "pigment" can be used more generally to describe not just pigment colorants, but other pigments such as organometallics, ferrites, ceramics, etc.

As used herein, "carrier fluid", refers to the fluid in which resins, pigment particles, colorants, and/or other additives can be dispersed to form an ink. The carrier fluids may include a mixture of a variety of different agents, such as surfactants, co-solvents, viscosity modifiers, and/or other possible ingredients.

In some examples, the colorants may comprise water-insoluble dye from the class of dyes known as solvent, or disperse, dyes. These dyes are, in general, substantially insoluble in water and completely or partially soluble in organic solvents. A sub-class of solvent dyes is known as sublimation dyes. These dyes disintegrate and diffuse into the media at temperatures as low as about 200° C.

Sublimation colorants may comprise "dispersions" in which micro-particulate dye solids are suspended within a dispersant system preferably containing water and a selected liquid or solid chemical dispersing agent. Many different commercially-available sublimation colorants may be employed in the methods and apparatus set out herein, which shall not be restricted to any particular ingredients for this purpose. For example, a first class of dye compositions consists of a group of materials known as "liquid colors", which basically involve sublimation coloring agents (in micro-particulate form) which are already suspended in a selected dispersant system. These "liquid color" materials typically contain about 50 to 80 wt % water, about 10 to 20 wt % of the coloring agent, about 5 to 10 wt % of the dispersant (either a solid or liquid type), and about 5 to 20 wt % of a humectant (for inhibiting water evaporation). Representative, non-limiting examples of these pre-manufactured, ready-to-use liquid color materials are commercially available from many sources including, but not limited to, BASF of Charlotte, N.C. under the trademark BAFIXAN. Examples of the coloring materials available from BASF include the following, with the C.I. (Color Index) name of the coloring agent in the composition being listed following the commercial name of the product: (1) BAFIXAN RED BF (CA. Disperse Red 60); (2) BAFIXAN YELLOW 3GE (CA. Disperse Yellow 54); (3) BAFIXAN BLUE R (CA. Disperse Blue 326); and (4) BAFIXAN BLACK BN (a blend of C.I. Disperse Red 60, C.I. Disperse Yellow 54, and C.I. Disperse Blue 79). Many other formulations involving the above-listed and other C.I. sublimation dyes may also be employed in the methods and apparatus set out herein.

Another class of ink compositions containing one or more sublimation dye coloring agents which may be employed in the methods and apparatus set out herein involve solid dye materials (e.g., in powder form) that can be combined during ink formulation with a selected liquid or solid dispersing agent, water, and the like. Specifically, these materials do not involve "pre-manufactured" liquid dye compositions as previously described in connection with the "liquid colors" listed above. Instead, they are subsequently converted into a liquid dispersion (having similar ingredients and proportions as those designated above in connection with the "liquid colors") immediately before or during ink production. Representative, non-limiting examples of these solid dye compositions include the following, with the C.I. (Color Index) name of the coloring agent in the composition being followed by the commercial name of the product: (1) C.I. Disperse Blue 3 (Keystone Aniline, Chicago, Ill.—SUBLAPRINT BLUE 70014); (2) C.I. Disperse Blue 14 (Keystone Aniline, SUBLAPRINT BLUE 70013); (3) C.I. Disperse Blue 72 (Tricon Colors, Elmwood, N.J.); (4) C.I. Disperse Blue 359 (Crompton & Knowles, Charlotte, N.C.—INTRATHERM BLUE P-1305NT); (5) C.I. Disperse Red 60 (Crompton & Knowles-INTRATHERM BRILLIANT RED P1314NT); and (6) C.I. Disperse Yellow 54 (Crompton & Knowles-INTRATHERM YELLOW P343NT). Again, the present disclosure is not limited to any particular sublimation dye coloring agents and ink compositions containing the same, with the representative products listed above being provided for example purposes.

In both of the previously-described classes of dye compositions (i.e., "liquid colors" and solid colorant materials), at least one liquid or solid dispersing agent is employed. Many different dispersing agents may be used for this purpose, including, but not limited to, acrylic polymers sold under the trademark JONCRYL by S. C. Johnson Co., Racine, Wis., condensed naphthalene sulfonates sold under the trademark LOMAR by the Henkel Co. of Kankakee, Ill., and sodium lignosulfonates sold by Lignotech, Rothschild, Wis. As noted above, the final liquid dye product (in completed dispersion form) in both embodiments may include about 50 to 80 wt % water, about 10 to 20 wt % dye, about 5 to 10 wt % dispersant, and about 5 to 20 wt % humectant. Representative humectants include 2-pyrrolidone, 1,5-pentanediol, diethylene glycol, and 2-ethyl-2- hydroxymethyl-1,3-propanediol. However, these values and materials may be varied in accordance with the particular dye compounds under consideration and other factors. The completed ink composition may contain about 0.1 to 12.5 wt % completed dispersion containing the selected sublimation dye coloring agent (e.g., the selected dye plus dispersant materials in combination).

In examples, the colorant(s) may comprise an LEP ink (pigmented LEP ink) including a dye or pigment. The dye or pigment can be any colorant compatible with the liquid carrier and useful for electrophotographic printing. For example, the dye or pigment may be present as pigment particles, or may comprise a resin and a pigment. The resins and pigments can be any of those standardly used in the art. In some examples, the pigment is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; STERLING® NSX 76, MOGUL® L; pigments by DuPont including TIPURE® R-101. Where the pigment is a white pigment particle, the pigment particle may be selected from the group consisting of TiO2, calcium carbonate, zinc oxide, and mixtures thereof. In some examples the white pigment particle may comprise an alumina-TiO2 pigment.

The pigment particle may be present in the LEP ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the pigment particle may be present in the LEP ink in an amount of at least 50 wt % of the total amount of resin and colorant or pigment, for example at least 55 wt % of the total amount of resin and pigment.

Examples of the LEP ink(s) include any commercially available LEP ink (e.g., ElectroInk available from HP Indigo).

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. Apparatus comprising:

a first radiation source to output radiation at a first waveband;

a second radiation source to output radiation at a second waveband, different from the first waveband;

wherein the apparatus is to receive a medium having marked thereon a first colorant and a second colorant; and wherein the first and second wavebands are selected such that an energy absorbance efficiency of the first colorant is higher than that of the second colorant at the first waveband and an energy absorbance efficiency of the second colorant is higher than that of the first colorant at the second waveband.

2. The apparatus of claim 1 wherein the first and second wavebands are selected such that a first absorption efficiency of the first colorant to the first waveband and a second absorption efficiency of the second colorant to the second waveband differ by no more than 50%.

3. The apparatus of claim 1 further comprising an LED array, wherein the LED array comprises the first radiation source and the second radiation source.

4. The apparatus of claim 1 wherein the first radiation source comprises a first LED and the second radiation source comprises a second LED.

5. The apparatus of claim 1 wherein an energy dose output from the first and second radiation sources is selected to maintain a difference in energy absorption between the first and second colorants to be within a threshold difference.

6. The apparatus of claim 1 wherein the radiation output from the first radiation source and the radiation output from the second radiation source comprise optical radiation.

7. The apparatus of claim 1 further comprising a printer to print the first colorant and the second colorant on to the medium.

8. The apparatus of claim 1 further comprising a plurality of sources to output a radiation at a plurality of wavebands; and wherein the first radiation source and the second radiation source are selected from the plurality of sources based on a predetermined set of colorants.

9. A method comprising:

providing a medium having marked thereon a first colorant and a second colorant;

irradiating the medium with a first radiation source and a second radiation source, wherein irradiating the medium comprises:

outputting radiation from the first radiation source in a first waveband to provide a first energy dose, wherein radiation in the first waveband is absorbed with a greater efficiency by the first colorant than by the second colorant; and outputting radiation from the second radiation source in a second waveband to provide a second energy dose, wherein radiation in the second waveband is absorbed with a greater efficiency by the second colorant than by the first colorant.

10. The method of claim 9 comprising selecting the first energy dose and the second energy dose such that absorbance of the radiation in the first and second waveband by the first colorant and by second colorant is within a predetermined threshold.

11. The method of claim 9 comprising selecting the first energy dose and the second energy dose such that absorbance of the radiation in the first waveband and radiation in the second waveband by the first and second colorants causes the first and second colorants to dry or fix on the medium.

12. The method of claim 9 comprising determining that a medium to be printed is a temperature sensitive medium and controlling a print apparatus to print the media with a set of colorants excluding a carbon black colorant.

13. The method of claim 9 wherein irradiating the medium comprises irradiating the medium with the first radiation source and the second radiation source simultaneously.

14. A method comprising:

determining, for a predetermined set of colorants, a radiation output from a first narrowband emitter and a second narrowband emitter to heat the colorants of the predetermined set of colorants, wherein determining the radiation output from the first and second narrowband emitters comprises:

determining an energy absorbance efficiency of each of the colorants at a plurality of wavebands;

selecting wavebands of the radiation output from the first and second narrowband emitters such that a colorant with a relatively low absorbance in the waveband emitted by the first narrowband emitter has a relatively high absorbance in the waveband emitted by the second narrowband emitter; and selecting a first output energy dose for the first narrowband emitter and a second output energy dose for the second narrowband emitter, wherein the first and second output energy doses are selected so as to maintain an energy absorption imbalance between the colorants to be within a threshold range.

15. The method of claim 14 wherein selecting the wavebands and the first and second output energy doses comprises selecting the wavebands and the output energy doses such that rates of heating of the colorants from absorption of the radiation output by the first and second narrowband emitters differ by no more than 50%.

* * * * *